United States Patent
Koyama

(10) Patent No.: US 11,151,696 B2
(45) Date of Patent: Oct. 19, 2021

(54) IMAGE PROCESSING APPARATUS, IMAGE PROCESSING METHOD, AND NON-TRANSITORY COMPUTER-READABLE MEDIUM

(71) Applicant: MORPHO, INC., Tokyo (JP)

(72) Inventor: Hiroshi Koyama, Tokyo (JP)

(73) Assignee: MORPHO, INC., Tokyo (JP)

( * ) Notice: Subject to any disclaimer, the term of this patent is extended or adjusted under 35 U.S.C. 154(b) by 97 days.

(21) Appl. No.: 16/718,198

(22) Filed: Dec. 18, 2019

(65) Prior Publication Data

US 2020/0202494 A1    Jun. 25, 2020

(30) Foreign Application Priority Data

Dec. 21, 2018   (JP) ................................ 2018-239337

(51) Int. Cl.
*G06T 5/00*   (2006.01)
*G06T 5/20*   (2006.01)
*G06T 3/20*   (2006.01)

(52) U.S. Cl.
CPC ............... *G06T 5/002* (2013.01); *G06T 3/20* (2013.01); *G06T 5/20* (2013.01); *G06T 2207/20182* (2013.01); *G06T 2207/20192* (2013.01)

(58) Field of Classification Search
CPC .. G06T 5/002; G06T 5/20; G06T 3/20; G06T 2207/20192; G06T 2207/20182
USPC ........................................................ 382/260
See application file for complete search history.

(56) References Cited

U.S. PATENT DOCUMENTS

| | | | | |
|---|---|---|---|---|
| 2012/0121204 | A1* | 5/2012 | Ding | G06T 3/0012 382/260 |
| 2016/0171648 | A1* | 6/2016 | Thibault | G01T 1/36 378/5 |
| 2016/0324505 | A1* | 11/2016 | Maeda | G06T 5/003 |
| 2018/0035058 | A1* | 2/2018 | Thumpudi | G06T 7/90 |
| 2018/0053289 | A1* | 2/2018 | Garcia Becerro | G06T 5/009 |
| 2018/0264288 | A1* | 9/2018 | Sakata | A61B 6/035 |
| 2019/0289329 | A1* | 9/2019 | Zhao | H04N 19/463 |

OTHER PUBLICATIONS

Kaiming He et al., "Guided Image Filtering", European Conference on Computer Vision, Sep. 5-11, 2010, pp. 1-14.
Jiangbo Lu et al., "Cross-Based Local Multipoint Filtering", Computer Vision and Pattern Recognition, Jun. 18-20, 2012, pp. 1-8.

* cited by examiner

*Primary Examiner* — Ali Bayat
(74) *Attorney, Agent, or Firm* — JCIPRNET

(57) ABSTRACT

An image processing apparatus for obtaining an output image by performing a filter processing of an input image, includes a setting unit configured to set a plurality of local regions in the input image, a deriving unit configured to derive a plurality of coefficients corresponding to each of the plurality of local regions based on statistics indicating variations in pixel values in the plurality of local regions, and a filter processing unit configured to obtain an output pixel value by performing a liner transformation of the input image based on the plurality of the coefficients, wherein the plurality of local regions include a region that is partitioned diagonally to a raster scan direction; wherein the filter processing unit performs the liner transformation of the input image based on a coefficient adaptively selected from the plurality of coefficients.

13 Claims, 16 Drawing Sheets

| a | 2a | 3a | 4a | 5a | 6a | 7a |
|---|----|----|----|----|----|----|
| 2a | 4a | 6a | 8a | 10a | 12a | 14a |
| 3a | 6a | 9a | 12a | 15a | 18a | 21a |
| 4a | 8a | 12a | 16a | 20a | 24a | 28a |
| 5a | 10a | 15a | 20a | 25a | 30a | 35a |
| 6a | 12a | 18a | 24a | 30a | 36a | 42a |
| 7a | 14a | 21a | 28a | 35a | 42a | 49a |

FIG. 8A

| 4a |  | 8a |  | 12a |
|----|----|----|----|----|
|  | 9a | 12a | 15a |  |
| 8a | 12a | 16a | 20a | 24a |
|  | 15a | 20a | 25a |  |
| 12a |  | 24a |  | 36a |

FIG. 8B

| $a^2$ | $2a^2$ | $3a^2$ | $4a^2$ | $5a^2$ | $6a^2$ | $7a^2$ |
|---|---|---|---|---|---|---|
| $2a^2$ | $4a^2$ | $6a^2$ | $8a^2$ | $10a^2$ | $12a^2$ | $14a^2$ |
| $3a^2$ | $6a^2$ | $9a^2$ | $12a^2$ | $15a^2$ | $18a^2$ | $21a^2$ |
| $4a^2$ | $8a^2$ | $12a^2$ | $16a^2$ | $20a^2$ | $24a^2$ | $28a^2$ |
| $5a^2$ | $10a^2$ | $15a^2$ | $20a^2$ | $25a^2$ | $30a^2$ | $35a^2$ |
| $6a^2$ | $12a^2$ | $18a^2$ | $24a^2$ | $30a^2$ | $36a^2$ | $42a^2$ |
| $7a^2$ | $14a^2$ | $21a^2$ | $28a^2$ | $35a^2$ | $42a^2$ | $49a^2$ |

FIG. 9A

| $4a^2$ |  | $8a^2$ |  | $12a^2$ |
|---|---|---|---|---|
|  | $9a^2$ | $12a^2$ | $15a^2$ |  |
| $8a^2$ | $12a^2$ | $16a^2$ | $20a^2$ | $24a^2$ |
|  | $15a^2$ | $20a^2$ | $25a^2$ |  |
| $12a^2$ |  | $24a^2$ |  | $36a^2$ |

FIG. 9B

| TARGET PIXELS | VARIANCE $\sigma^2$ | AVERAGE $\mu$ | COEFFICIENT $a$ | COEFFICIENT $b$ |
|---|---|---|---|---|
| k0,k5,k10,k15,k20 | 11.36 | 2.68 | 0.54 | 1.24 |
| k1,k6,k11,k16,k21 | 11.91 | 4.08 | 0.54 | 1.86 |
| k2,k7,k12,k17,k22 | 8.18 | 5.48 | 0.45 | 3.01 |
| k3,k8,k13,k18,k23 | 0.36 | 6.88 | 0.03 | 6.64 |
| k4,k9,k14,k19,k24 | 0.36 | 6.88 | 0.03 | 6.64 |

FIG. 15 (Related Art)

| LOCAL REGION | VARIANCE $\sigma^2$ | AVERAGE $\mu$ | COEFFICIENT $a$ | COEFFICIENT $b$ | WEIGHT $w$ |
|---|---|---|---|---|---|
| j0 | 3.00 | 6.00 | 0.23 | 4.62 | 0.05 |
| j1 | 3.00 | 6.00 | 0.23 | 4.62 | 0.05 |
| j2 | 3.00 | 6.00 | 0.23 | 4.62 | 0.05 |
| j3 | 3.00 | 6.00 | 0.23 | 4.62 | 0.05 |
| j4 | 3.00 | 6.00 | 0.23 | 4.62 | 0.05 |
| j5 | 12.33 | 3.67 | 0.55 | 1.64 | 0.01 |
| j6 | 12.33 | 3.67 | 0.55 | 1.64 | 0.01 |
| j7 | 12.33 | 3.67 | 0.55 | 1.64 | 0.01 |

FIG. 16

IMAGE PROCESSING APPARATUS, IMAGE PROCESSING METHOD, AND NON-TRANSITORY COMPUTER-READABLE MEDIUM

CROSS-REFERENCE TO RELATED APPLICATION

This application is based on Japanese Patent Application No. 2018-239337 filed with Japan Patent Office on Dec. 21, 2018, the entire contents of which are hereby incorporated by reference.

BACKGROUND

Field of Invention

The present invention relates to an image processing technique for reducing noise while preserving edges.

Background Arts

Conventionally, it has been proposed that an image processing technique for smoothing fine variations in density due to noises while preserving edges by performing a filter processing using a guided filter (for example, see Non-Patent Literature 1: "Guided Image Filtering", by Kaiming He, Jian Sun, and Xiaoou Tang, in ECCV 2010).

SUMMARY OF INVENTION

"Guided Image Filtering" discloses a method for obtaining coefficients based on variance of pixel values in local regions, and performing liner transformation of an input image using these coefficients to obtain an output image. However, in a case where an edge is included in a local region, a coefficient is derived so as to preserve the edge. This means that the coefficient is derived so as to reduce a degree of smoothing. Therefore, a difference may occur in a degree of residual noise between edge regions and other regions.

An image processing apparatus according to an aspect of the present invention is an image processing apparatus for obtaining an output image by performing a filter processing of an input image. The image processing apparatus includes: a setting unit configured to set a plurality of local regions in the input image, a deriving unit configured to derive a plurality of coefficients corresponding to each of the plurality of local regions based on statistics indicating variations in pixel values in the plurality of local regions, and a filter processing unit configured to obtain an output pixel value by performing a liner transformation of the input image based on the plurality of the coefficients, wherein the plurality of local regions include a region that is partitioned diagonally to a raster scan direction, wherein the filter processing unit performs the liner transformation of the input image based on a coefficient adaptively selected from the plurality of coefficients.

According to the present invention, it is possible to output a high-quality image by reducing noise around edges.

BRIEF DESCRIPTION OF THE DRAWINGS

FIG. 8A illustrates an exemplary integral image according to the present embodiment.

FIG. 8B illustrates an exemplary local region according to the present embodiment.

FIG. 9A illustrates an exemplary integral image according to the present embodiment.

FIG. 9B illustrates an exemplary local region according to the present embodiment.

FIG. 15 illustrates an example of variances $\sigma^2$, averages $\mu$, coefficients a and b corresponding to each of target pixels k0, k1, . . . , k24 according to the prior art.

FIG. 16 illustrates an example of variances $\sigma^2$, averages $\mu$, coefficients a and b corresponding to each of target pixels k0, k1, . . . , k24 according to the present embodiment.

DESCRIPTION OF EMBODIMENTS

Hereinafter, embodiments of the present invention will be described with reference to the accompanying drawings. However, the components described in this embodiment are exemplary and are not intended to limit the scope of the present disclosure.

(Principle of Guided Filter)

Prior to the description of the present embodiment, the principle of the guided filter will be described.

Figure 1:
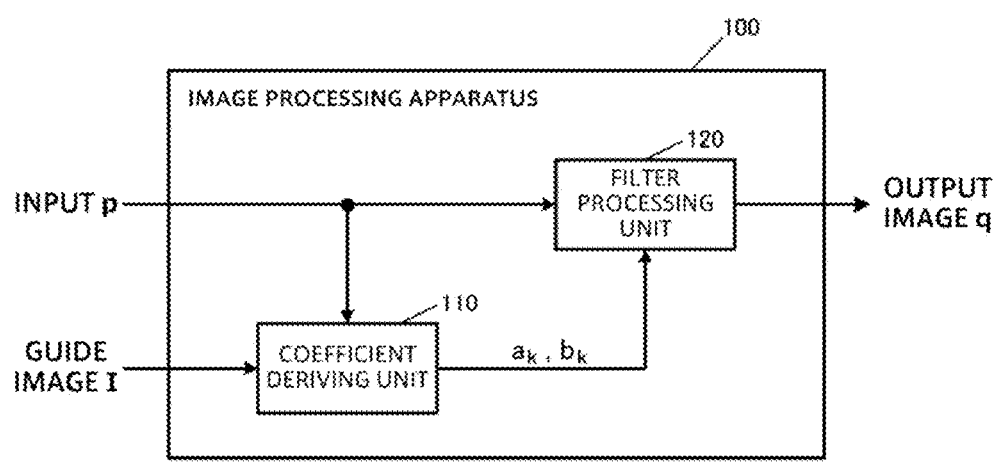
FIG. 1 is a functional block diagram of an image processing apparatus according to the prior art.

FIG. 1 is a functional block diagram illustrating a software function of an image processing apparatus 100 according to the prior art. The image processing apparatus 100 includes a coefficient deriving unit 110 and a filter processing unit 120. The image processing apparatus 100 performs guided filter processing based on an input image p (hereinafter referred to as "image p" as appropriate) and a guide image I, and outputs an output image q (hereinafter referred to as "image q" as appropriate).

Here, it is assumed that a pixel value of the guide image I is multiplied by a and further b is added to approximate the image p. In a case where the image q is regarded as a locally linear transform of the guide image I, coefficients a and b can be obtained as values for minimizing the following energy function E.

$$E(a_k, b_k) = \sum_{i \in \omega_k} ((a_k I_i + b_k - p_i)^2 + \epsilon a_k^2) \qquad (1)$$

In expression (1), the subscript k of the coefficients a and b represents an index of the pixel from which the coefficients a and b are derived (hereinafter referred to as "target pixel"). In addition, $\omega_k$ represents a local region (hereinafter referred to as a "local region") set based on the target pixel k. In this prior art, the local region is described as a region of 5×5 pixels centered on the target pixel k.

ε is a regularization parameter, and the $a_k$ decreases as c increases (i.e., the degree of smoothing in the local region $\omega_k$ increases). In expression (1), the first term in parentheses on the right side represents the difference between the guide image I and the image p after linear transformation, and the second term represents the regularization term of the coefficients $a_k$.

The solution of the energy function E in expression (1) is:

$$a_k = \frac{\frac{1}{|\omega|}\left(\sum_{i \in \omega_k} I_i p_i\right) - \mu_k \bar{p}_k}{\sigma_k^2 + \epsilon} \qquad (2)$$

$$b_k = \bar{p}_k - a_k \mu_k \qquad (3)$$

In expressions (2) and (3), $\sigma_k^2$ represents the variance of the local region in the guide image I, $\mu_k$ represents the average of the local region in the guide image I, and $\bar{p}_k$ represents the average of the local region in the image p.

When the guide image I equals the input image p, since $\bar{p}_k$ equals $\mu_k$, $a_k$ and $b_k$ are as follows:

$$a_k = \frac{\sigma_k^2}{\sigma_k^2 + \epsilon} \qquad (4)$$

$$b_k = (1 - a_k)\mu_k \qquad (5)$$

Here, the variance $\sigma_k^2$ is as follows:

$$\sigma_k^2 = \frac{\sum_i I_i^2}{n} - \left(\frac{\sum_i I_i}{n}\right)^2 \qquad (6)$$

Also, the average is as follows:

$$\mu_k = \frac{\sum_i I_i}{n} \qquad (7)$$

Therefore, the above-mentioned coefficients $a_k$ and $b_k$ can be represented as follows:

$$a_k = \frac{\sigma_k^2}{\sigma_k^2 + \epsilon} = \frac{\frac{\sum_i I_i^2}{n} - \left(\frac{\sum_i I_i}{n}\right)^2}{\frac{\sum_i I_i^2}{n} - \left(\frac{\sum_i I_i}{n}\right)^2 + \epsilon} \qquad (8)$$

$$b_k = (1 - a_k)\mu_k = (1 - a_k)\frac{\sum_i I_i}{n} \qquad (9)$$

The coefficient deriving unit 110 can derive the coefficients $a_k$ and $b_k$ based on the expressions (8) and (9). As illustrated in expression (6), it is known that when the variance of a local region is calculated, mean square of the pixel values in the local region and the average of the pixel values in the local region are used. Therefore, by preparing an integral image for each of the guide image I and the image $I^2$ obtained by squaring the respective pixel values of the guide image I, it is possible to derive the coefficients $a_k$ and $b_k$ for each local region easily. Further, $\sigma_k^2 \geq 0$ satisfies $0 \leq a_k \leq 1$ and $0 \leq b_k \leq 255$. In this embodiment, since the pixel values of the guide image I, the image p, and the image q are represented by the 8-bit tone values (0 to 255), the maximum value of the $b_k$ is 255, but in a case where the pixel values are represented by other tone values, the maximum value may be varied.

Since the image q is considered to obtain by performing a liner transformation of the guide image I locally, $q_k$ can be represented as:

$$q_k = a_k I_k + b_k \qquad (10)$$

Here, $b_k$ is represented as:

$$b_k = (1 - a_k)\mu_k \qquad (5)$$

Therefore, the expression (10) can be represented as:

$$q_k = a_k I_k + (1 - a_k)\mu_k \qquad (11)$$

This means that the $q_k$ is an alpha-blend of $I_k$ and $\mu_k$. Since the guide image I equals the input image p, the filter processing unit 120 can obtain the output $q_k$ by applying the coefficients $a_k$ and $b_k$ derived by the coefficient deriving unit 110 and the input image p (=guide image I) to expression (10).

Referring to the expression (4), in a case where $\sigma_k^2$ is large, $\sigma_k^2$ may be:

$$a_k \approx 1 \qquad (12)$$

On the other hand, in a case where $\sigma_k^2$ is small, $\sigma_k^2$ is may be:

$$a_k \approx 0 \qquad (13)$$

Therefore, in a case where $\sigma_k^2$ is large, $q_k$ can be represented as:

$$q_k = a_k I_k + (1 - a_k)\mu_k \approx I_k \qquad (14)$$

On the other hand, in a case where $\sigma_k^2$ is small, $q_k$ can be represented as:

$$q_k = a_k I_k + (1 - a_k)\mu_k \approx \mu_k \qquad (15)$$

In a case where edges are included in the local region, the variance $\sigma_k^2$ increases, so that the pixel value of the target pixel approximates the pixel value of the guide image I. In other words, smoothing is suppressed in the target pixel, and the effect of edge preservation occurs.

The above description is the reason why, in a case where the guide image I equals the input image p, the guided filter processing has the property of reducing noise while preserving edges.

(Problems of Guided Filter Processing in the Prior Art)

Next, the problem of the guided filter processing in the prior art will be described with reference to FIG. 2.

Figure 2A:
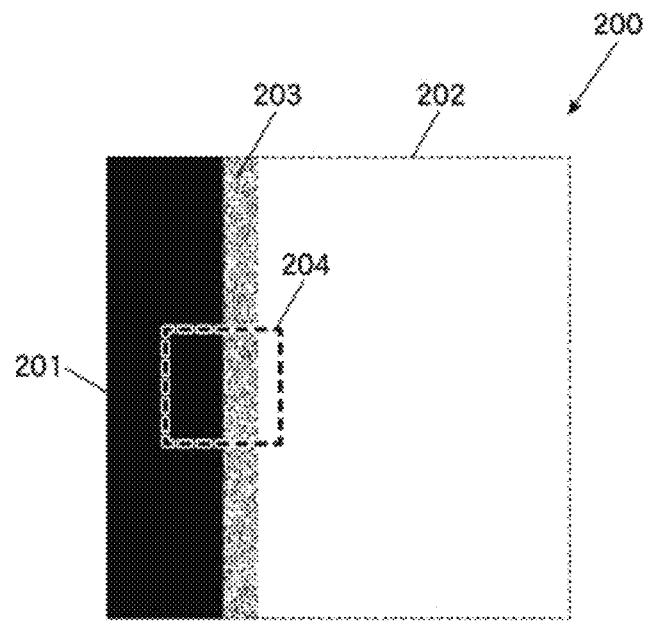
FIG. 2A illustrates an example of an image including an edge.

FIG. 2A illustrates an example of an image 200 including edges. In FIG. 2A, a black pixel region 201, which is a group of black pixels, and a white pixel region 202, which is a group of white pixels, are shown. The boundary between the black pixel region 201 and the white pixel region 202 becomes an edge at which the pixel value changes sharply. The region 204 sectioned by the broken line indicates the surrounding of the edge.

Figure 2B:
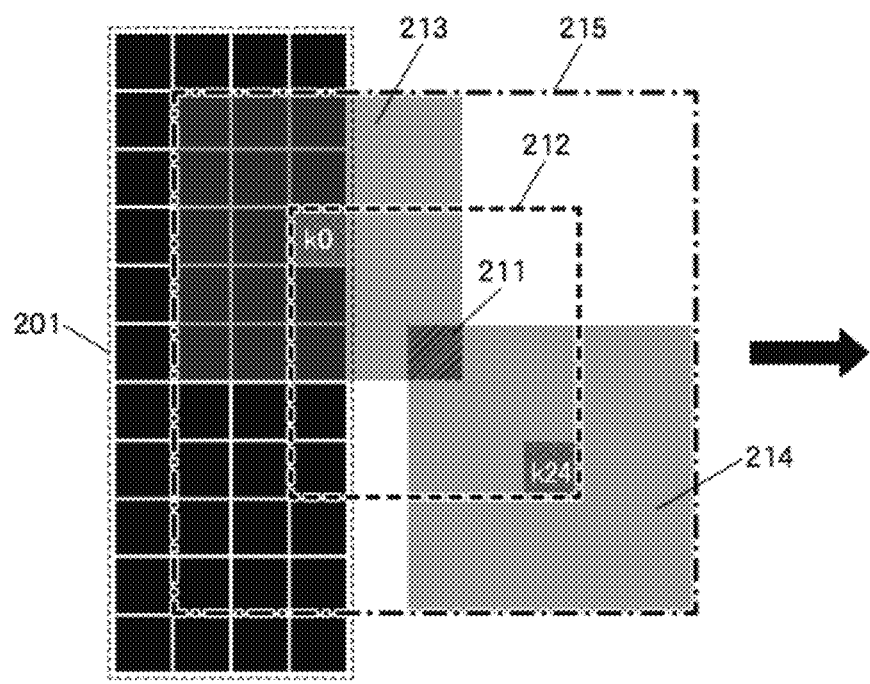
FIG. 2B illustrates an enlarged view around the edge in FIG. 2A.

FIG. 2B is an enlarged view of the surrounding of the edges. FIG. 2B schematically illustrates a state in which a conventional guided filter processing is performed. The region sectioned by the broken line is a filter region 212 of 5×5 pixels centered on a pixel of interest 211. As illustrated in FIG. 2B, coefficients $(a_k0, b_k0), (a_k1, b_k1) \ldots (a_k24, b_k24)$ are derived for the pixels k0, k1 ... k24 which partition the filter region 212. In deriving the coefficients $a_k$ and $b_k$, variances and averages in a local region of 5×5 pixels centered on the target pixel k are used. In FIG. 2B, a local region 213 corresponding to the target pixel k0 and a local region 214 corresponding to the target pixel k24 are schematically shown. The region sectioned by the dash-dot line is the extension 215 of the local regions corresponding to the target pixels k0 to k24. Also, an arrow in FIG. 2B indicates the raster scan direction of the pixel of interest 211.

Non-Patent Literature 1 proposes a technique of obtaining coefficients $\overline{a_k}$ and $\overline{b_k}$ corresponding to the pixel of interest 211 by simply averaging the coefficients $a_k$ and $b_k$ derived for each of the target pixels k0, k1 ... k24. Since the local region 213 includes edges, the variance $\sigma_k^2$ increases, and the coefficients $a_k0$ and $b_k0$ are derived so that the dependency of the original guide image I increases, i.e., so that the degree of smoothing of the target pixel k0 decreases. Even when the coefficients $a_k0 \ldots a_k24, b_k0 \ldots b_k24$ are simply averaged, the coefficients $\overline{a_k}$ and $\overline{b_k}$ are derived so as to reduce the degree of smoothing of the pixel of interest 211 due to the effect of the coefficient derived from the local region including the edges. As a result, in the image q, a region 203 in which noises remain around edges may occur.

Embodiment

Hereinafter, an edge preserving noise reduction technique according to the present embodiment will be described.

(Hardware Components of the Image Processing Apparatus)

Figure 3:
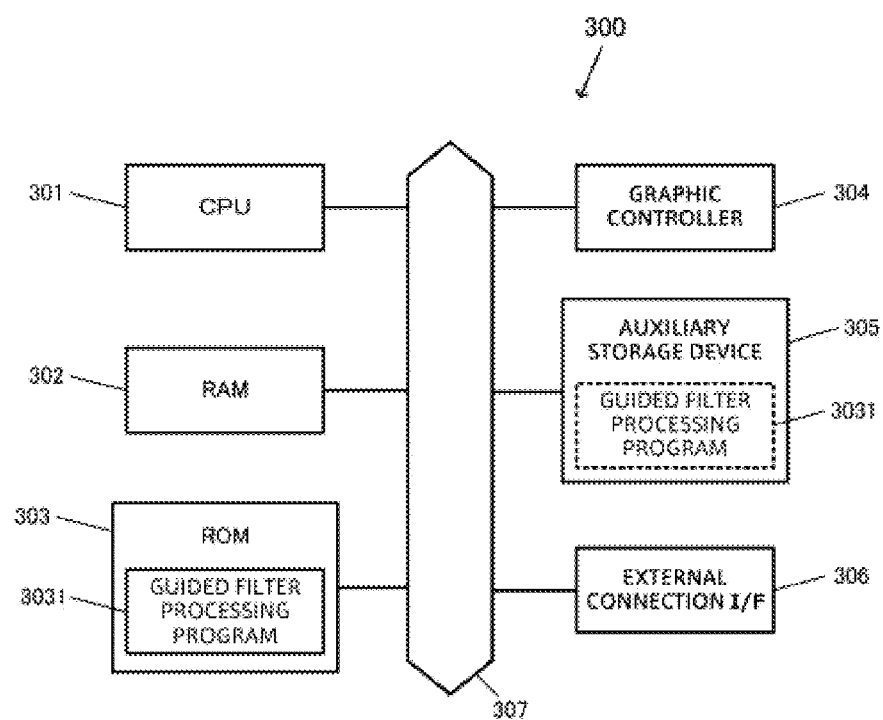
FIG. 3 is an example of a hardware components block diagram of the image processing apparatus according to the present embodiment.

FIG. 3 is a block diagram illustrating an example of hardware components of the image processing apparatus 300 according to the present embodiment.

As illustrated in FIG. 3, the image processing apparatus 300 is configured as a normal computer or a computer system including a CPU (Central Processing Unit) 301 which is a type of a processing unit or a control unit, a RAM (Random Access Memory) 302 which is a type of a storage unit, a ROM (Read Only Memory) 303 which is a type of a storage unit, a graphic controller 304 which is a type of a processing unit or a control unit, an auxiliary storage device 305 which is a type of a storage unit, an external connection I/F 306 which is a type of a communication unit, and a bus 307.

The CPU 301 includes arithmetic circuits and the like, and performs overall control of the image processing apparatus 300. The CPU 301 may also be referred to as a processor or a controller. The processor and the controller may include a DSP (Digital Signal Processor), an ASIC (Application Specific Integrated Circuit), and the like in addition to the CPU301.

The CPU301 reads, for example, programs stored in the ROM303 or the auxiliary storage device 305 into the RAM 302, and executes various processes.

The ROM303 is a read-only memory, and stores a system program and the like used for controlling the image processing apparatus 300.

The graphic controller 304 is a type of a processing unit or a control unit, and generates a screen to be displayed on a display device (not illustrated).

The auxiliary storage device 305 stores application programs and the like for executing various processes. The auxiliary storage device 305 includes, for example, an HDD (Hard Disk Drive), an SSD (Solid State Drive), and the like. The auxiliary storage device 305 functions as a storage area.

The external connection I/F 306 is a type of communication unit, and is an interface for connecting the image processing apparatus 300 to an external apparatus via a network.

Each of the above-mentioned components is communicably connected via the bus 307.

Figure 4:
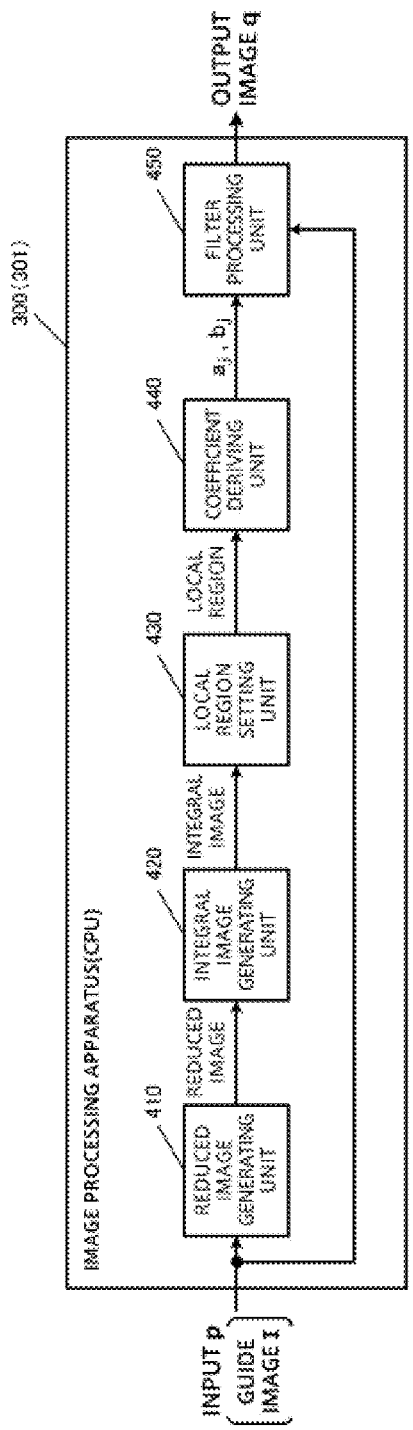
FIG. 4 is an example of a functional block diagram of the image processing apparatus according to the present embodiment.

The functions of the image processing apparatus 300 illustrated in FIG. 4 are realized by, for example, hardware illustrated in FIG. 3.

(Functions of the Image Processing Apparatus)

FIG. 4 is a block diagram illustrating an example of a software functional configuration of the image processing apparatus 300 according to the present embodiment.

The functions of the blocks in FIG. 4 are realized by the CPU301 reading a guided filter processing program 3031, which is one of program codes stored in the ROM303 or the auxiliary storage device 305, into the RAM302 and executing the program. Some or all of the functions of these blocks may be implemented by hardware such as ASIC.

The image processing apparatus 300 includes, for example, a reduced image generating unit 410, an integral image generating unit 420, a local region setting unit 430, a coefficient deriving unit 440, and a filter processing unit 450. These functional units can also be referred to as functional blocks of the CPU 301.

The reduced image generating unit 410 generates a reduced image, which is an image obtained by reducing the input image p. Details of the reduced image will be described later.

The integral image generating unit 420 generates an integral image from the reduced image generated by the reduced image generating unit 410. The integral image generally refers to an image obtained by integrating pixel values. In the present embodiment, two types of integral images are generated: an integral image in which a sum of pixel values is calculated, and an integral image in which a sum of pixel values squared is calculated.

The local region setting unit 430 sets the variance $\sigma^2$ required to derive the coefficients a and b, and the local region j for which the average μ is to be calculated. The local region j of the present embodiment will be described later.

The coefficient deriving unit 440 derives coefficients $a_j$ and $b_j$ corresponding to the local region j.

The filter processing unit 450 acquires coefficients $\overline{a_j}$ and $\overline{b_j}$ based on the coefficients $a_j$ and $b_j$ derived by the coefficient deriving unit 440, and applies these coefficients to the input image p (=guide image I), and outputs an image q (output image q).

(Guided Filter Processing)

Figure 5:
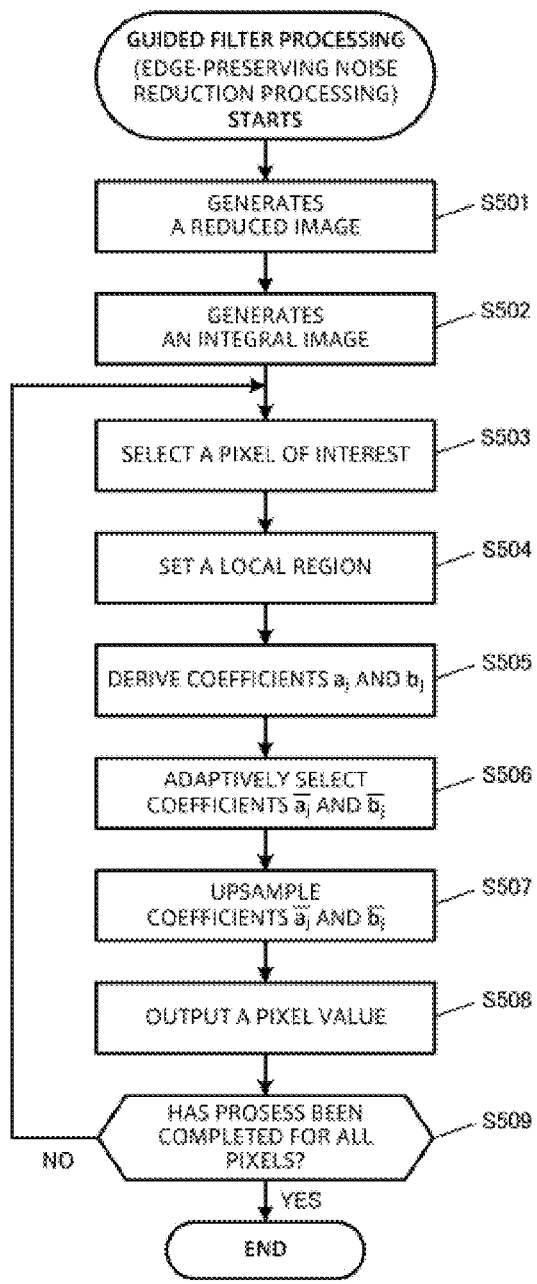
FIG. 5 is an example of a flowchart illustrating guided filter processing according to the present embodiment.

FIG. 5 is a flowchart illustrating an example of a procedure of a guided filter processing according to the present embodiment. The processing in the flowchart of FIG. 5 is realized by the CPU301 reading out a guided filter processing program 3031 (program code) stored in the ROM303 or the auxiliary storage device 305 to the RAM302 and executing the program code. Each symbol S in the flowchart of FIG. 5 means a step.

In S501, the reduced image generating unit 410 generates a reduced image of the input image p.

Here, referring to FIGS. 6A, 6B, 6D and 6E, reduced images in the present embodiment will be described.

Figures 6A, 6B, 6C:
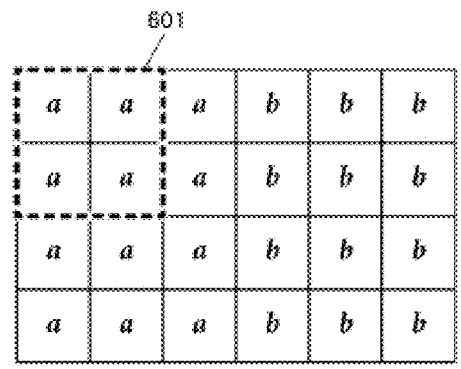
FIG. 6A illustrates an exemplary image p.
FIG. 6B illustrates an exemplary reduced image of image p.
FIG. 6C illustrates an exemplary integral image of image p.

FIG. 6A is a schematic diagram illustrating a part of the image p. In FIG. 6A, a and b respectively represent pixel values, and a broken line in the figure means a reduction unit 601 (a pixel unit of a reduced image). That is, in this embodiment, a region of 2×2 pixels is one pixel after reduction.

Here, the reduction unit 601 (pixel unit of the reduced image) is 2×2 pixels, but the embodiment is not limited to this. The reduction unit 601 can be appropriately set and changed, and may be 3×3 pixels, 4×4 pixels, or the like.

FIG. 6B is a diagram illustrating an exemplary reduced image obtained by reducing the image p of FIG. 6A. As illustrated in FIG. 6B, it can be seen that the pixel value averaged every 2×2 pixels is the pixel value of the pixel after reduction.

Figures 6D, 6E, 6F:
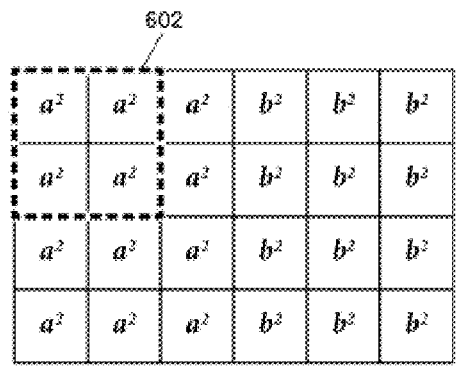
FIG. 6D illustrates an exemplary image $p^2$.
FIG. 6E illustrates an exemplary reduced image of image $p^2$.
FIG. 6F illustrates an exemplary integral image of image $p^2$.

FIG. 6D is a diagram illustrating an exemplary image $p^2$ obtained by squaring the pixel values of FIG. 6A. In the present embodiment, not only the reduced image obtained by averaging the pixel values but also the reduced image obtained by averaging the squares of the pixel values are generated. Also in FIG. 6D, a reduction unit 602 is 2×2 pixels.

FIG. 6E is a diagram illustrating an exemplary reduced image obtained by reducing the image p2 of FIG. 6D. As illustrated in FIG. 6D, it can be seen that the pixel value averaged every 2×2 pixels is the pixel value of the pixel after reduction.

Returning to the flowchart of FIG. 5, in S502, the integral image generating unit 402 generates an integral image from the reduced image generated in S501.

Here, referring to FIGS. 6C and 6F, integral images in the present embodiment will be described.

FIG. 6C is a diagram illustrating an exemplary integral image generated from the reduced image of FIG. 6B. When the top left pixel in the reduced image of FIG. 6B is set as the origin, the integral image generating unit 420 calculates the sum of pixel values from the origin to the respective pixels. In FIG. 6C, an integral image example in which the sum of pixel values from the origin is calculated for each pixel is illustrated.

FIG. 6F is a diagram illustrating an exemplary integral image generated from the reduced image of FIG. 6E. FIG. 6F illustrates an example of an integral image in which the sum of squares of pixel values from the origin is calculated for each pixel.

As described above, it is known that the mean square of the pixel values in the local region and the average of the pixel values in the local region are used in a case where the variance of the local region is obtained. By preparing a reduced image and an integral image of the reduced image in advance, these values can be easily obtained. Examples of FIGS. 6A to 6F are as follows.

$$\text{MEAN SQUARE OF THE PIXEL VALUES:} (3a^2 + 3b^2) \times \frac{1}{6} = \frac{a^2 + b^2}{2} \quad (16)$$

$$\text{AVERAGE:} (3a + 3b) \times \frac{1}{6} = \frac{a+b}{2} \quad (17)$$

In a case where the variance $\sigma^2$ is calculated based on these values, the following result is obtained:

$$\sigma^2 = \frac{a^2 + b^2}{2} - \left(\frac{a+b}{2}\right)^2 = \frac{(a-b)^2}{4} \quad (18)$$

This is the same as the variance $\sigma^2$ obtained by calculating the image p of FIG. 6A and the image $p^2$ of FIG. 6D.

Returning to the flowchart of FIG. 5, in S503, the CPU 301 (a target pixel selecting unit (not illustrated)) selects a target pixel in the reduced image (image p). In S503, for example, the CPU 301 selects a pixel of interest by performing raster scanning from the pixels that were the object of the previous process.

Thereafter, in S504, the local region setting unit 430 sets a local region j.

Here, the local region j in the present embodiment will be described with reference to FIG. 7.

Figure 7:
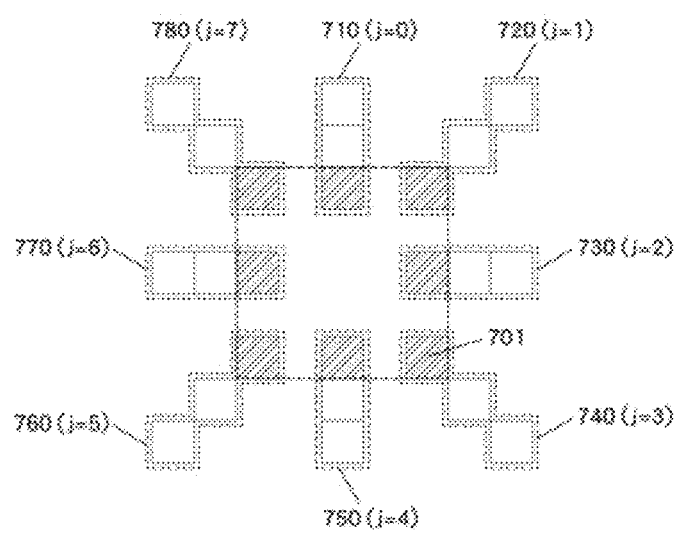
FIG. 7 illustrates an example of a local region according to the present embodiment.

FIG. 7 illustrates an example of the local regions 710 to 780 (local regions j0 to j7) of the present embodiment.

In the present embodiment, the local region is a region including the pixel of interest, and is set as a plurality of regions extending radially with respect to the pixel of interest as a reference. The eight pixels hatched in FIG. 7 are actually one pixel of interest 701, but the pixel of interest 701 is illustrated disassembled for the sake of convenience in order to make the eight local regions j (j=0 to 7) to be set easy to understand.

The local regions 710 to 780 of the present embodiment are formed by a plurality of arms extending radially with reference to the pixel of interest 701. In an example of FIG. 7, multiple arms are illustrated that extend equally in eight directions from the pixel of interest 701 and that extend evenly in upper, upper right, right, lower right, lower, lower left, left, and upper left. Regions consisting of three pixels including the pixel of interest 701 included in each arm are local regions 710 to 780 (j=0 to 7).

However, the above example is merely an example, and the embodiment is not limited thereto. Specifically, the number of arms need not be eight. For example, four arms extending in four directions of upper right, lower right, lower left, and upper left at equal intervals with reference to the pixel of interest may be used. Further, as long as the arm extends in a direction diagonally to the raster scan, the pixels included in the arm may extend intermittently, or the arm width may not be a line for one pixel. Further, the number of pixels included in the arm may not be three.

Returning to the flowchart of FIG. 5, in S505, the coefficient deriving unit 440 derives the coefficients $a_j$ and $b_j$ for the local region j. In the present embodiment, the sum of the pixel values obtained from the local regions j0 to j7 and the sum of the squares of the pixel values are applied to expressions 8 and 9 to derive the coefficients $a_j0$ to $a_j7$, $b_j0$ to $b_j1$ for the local regions j0 to j7, respectively.

Here, a method of obtaining a sum of pixel values in a local region from an integral image will be described by referring to FIGS. 8A and 8B.

FIG. 8A illustrates a specific example of the integral image in which the sum of the pixel values is calculated, and FIG. 8B illustrates a specific example of the local region set for the integral image of FIG. 8A. In order to simplify the explanation, it is assumed that the integral image in FIG. 8B is generated from a reduced image in which the pixel values of all the pixels are a. The local region of FIG. 8B has the same shape as the local region of FIG. 7. Further, in FIG. 8B, examples of the local region set when the pixel of interest is positioned at the third pixel in the horizontal direction and at the third pixel in the vertical direction with reference to the origin (i.e., when the pixel value of the pixel of interest is 16a) are illustrated.

When a local region is a rectangle, the sum of the pixel values in the local region can be obtained by adding and subtracting the pixel values at four points in the integral image. In the integral image of FIG. 8A, when each pixel position is represented by a coordinate system in which the origin is (x, y)=(0, 0), the local region j0 is a region partitioned by (x, y)=(3, 1) to (3, 3). The sum $\Sigma$ of the pixel values in the local region j0 can be obtained by subtracting the sum $\Sigma_B$ of the pixel values in the rectangular region B: (0, 0) to (2, 3) and the sum $\Sigma_C$ of the pixel values in the rectangular region C: (0, 0) to (3, 0) from the sum $\Sigma_A$ of the pixel values in the rectangular region A: (x, y)=(0, 0) to (3, 3), and further by adding the sum $\Sigma_D$ of the pixel values in the rectangular region D:(0, 0) to (2, 0). Since the pixel value in the integral image is the sum of the pixel values from the origin to the pixel position, the sum of the pixel values in the local region j0 in FIG. 8B can be calculated as follows:

$$\text{Sum of Pixel Values in } j0 : 16a - 12a - 4a + 3a = 3a \quad (19)$$

In a case where the local region extends diagonally with respect to the raster scan direction, the sum of the pixel values in the local region can be obtained by adding and subtracting the pixel values at 12 points in the integral image. For example, in the case of the local region j7, the pixel values of the adjacent upper and adjacent left pixels are respectively subtracted from the pixel of interest (the pixel of the pixel value 16a at the center), and the operation of adding the pixel values of the adjacent upper left pixels is repeated up to the pixel of the origin (the pixel of the pixel value a), whereby the sum of the pixel values can be calculated as follows. In this case, since the number of pixel values to be added and subtracted becomes larger as compared with expression 19, the sum of the pixel values in the local region may be obtained by storing the reduced image in the storage unit and summing the corresponding pixel values in the local region in the reduced image.

$$\text{Sum of Pixel Values in } J7 : (16a - 12a - 12a + 9a) + (9a - 6a - 6a + 4a) + (4a - 2a - 2a + a) = 3a \quad (20)$$

FIG. 9A illustrates a specific example of an integral image in which a sum of squares of pixel values is calculated, and FIG. 9B illustrates a specific example of a local region set for the integral image of FIG. 9A. The difference between the integral image of FIG. 9A and the integral image of FIG. 8B is the difference between whether or not the pixel values are squared. The method of calculating the sum of the squares of the pixel values in the local region is the same as the method of obtaining the sum of the pixel values in the local region (FIG. 8B), and therefore, the explanation thereof is omitted.

Returning to the flowchart of FIG. 5, in S506, the filter processing unit 450 adaptively selects coefficients $\overline{a_j}$ and $\overline{b_j}$ to be used for outputting the image q from the coefficients $a_j0 \sim a_j7$, $b_j0 \sim b_j7$.

In the present embodiment, weighted averaging is performed on the coefficients $a_j0 \sim a_j7$, $b_j0 \sim b_j7$ in accordance with the variance $\sigma^2$ in each of the local regions j0 to j7 to obtain a set of coefficients $\overline{a_j}$ and $\overline{b_j}$. The weighted average coefficients $\overline{a_j}$ and $\overline{b_j}$ are expressed in the following expressions.

$$\overline{a_J} = \frac{\sum_{j=0}^{7} w_{k,j} a_{k,j}}{\sum_{j=0}^{7} w_{k,j}} \quad (21)$$

$$\overline{b_J} = \frac{\sum_{j=0}^{7} w_{k,j} b_{k,j}}{\sum_{j=0}^{7} w_{k,j}} \quad (22)$$

In the present embodiment, the weight in the weighted average is expressed by the following expression 23. As illustrated in expression 23, the weight becomes smaller as the variance $\sigma^2$ becomes larger, and the weight becomes larger as the variance $\sigma^2$ becomes smaller.

$$w_j = 1/(\sigma_j^4 + \varepsilon) \quad (23)$$

In the present embodiment, the method of obtaining the coefficients $\overline{a_j}$ and $\overline{b_j}$ by weighted averaging the coefficients $a_j0 \sim a_j7$, $b_j0 \sim b_j7$ has been described, but the present embodiment is not limited to this.

Specifically, for example, a plurality of local regions may be sorted in order of decreasing variance $\sigma^2$, and a set of coefficients $\overline{a_j}$ and $\overline{b_j}$ may be derived from coefficients $a_j$ and $b_j$ derived from the local regions up to a predetermined order. Alternatively, a threshold may be set in the variance $\sigma^2$, and a set of coefficients $\overline{a_j}$ and $\overline{b_j}$ may be derived from coefficients $a_j$ and $b_j$ derived from a local region in which the variance $\sigma^2$ is less than or equal to the threshold, among a plurality of local regions.

In S507, the filter processing unit 450 upsamples the coefficients $\overline{a_j}$ and $\overline{b_j}$. This is a process performed corresponding to the reduced image generation process (S501), and in this upsampling process, the coefficients $\overline{a_j}$ and $\overline{b_j}$ derived in the S506 are associated with a plurality of pixels corresponding to the reduction ratio. In the present embodiment, since the reduction units 601 and 602 are 2×2 pixels, coefficients $\overline{a_j}$ and $\overline{b_j}$ are associated with regions of 2×2 pixels in the image after upsampling.

In S508, the filter processing unit 450 outputs the image q based on the image p and the coefficients $\overline{a_j}$ and $\overline{b_j}$. More specifically, the coefficients $\overline{a_j}$ and $\overline{b_j}$ are applied to the pixel of interest of image p (expression 10), and the pixel value of image q is output.

In S509, it is determined whether or not the process has been completed for all pixels in the image p in which the inputs have been received. If the process has not been completed for all pixels (S509: NO), the process returns to S503 and S503~S509 are repeated. If the process has been completed for all the pixels (S509: YES), the guided filter processing (this flowchart) ends.

(Advantageous Effect of Guided Filter Processing in the Embodiment)

In the present embodiment, in the image processing apparatus 300, the local region setting unit 430 sets a plurality of local regions j in the input image p (integral image), and the coefficient deriving unit 440 derives a plurality of coefficients $a_j$ and $b_j$ corresponding to each of the plurality of local regions j based on the variance of the pixel values in the plurality of local regions j. Further, the filter processing unit 450 linearly transforms the image p based on the plurality of coefficients $a_j$ and $b_j$ to obtain output pixel values. The plurality of local regions j set by the local region setting unit 430 include regions partitioned diagonally with respect to the raster scanning direction, and the filter processing unit 450 performs linear transformation based on coefficients $\bar{a}_j$ and $\bar{b}_j$ adaptively selected from the plurality of coefficients $a_j$ and $b_j$.

In the present embodiment, an example of deriving a plurality of coefficients $a_j$ and $b_j$ corresponding to each of the plurality of local regions j based on the variance of the pixel values in the plurality of local regions j is described. However, a plurality of coefficients $a_j$ and $b_j$ corresponding to each of the plurality of local regions j may be derived not only on the basis of variances but also on the basis of statistics indicating variations in pixel values in each of a plurality of local regions j, such as standard deviations or the like.

The advantageous effect of the guided filter processing in the present embodiment will be described with reference to FIGS. 10A and 10B.

Figure 10A:
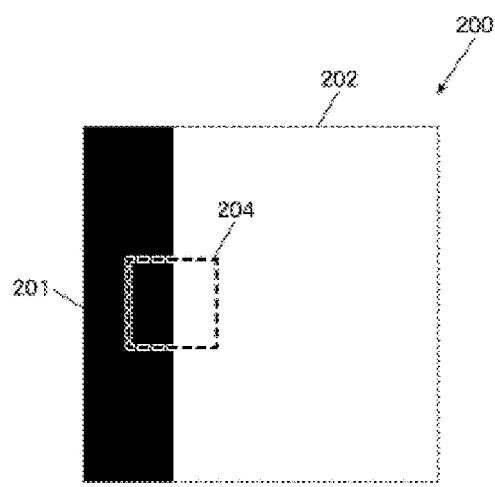
FIG. 10A illustrates an example of an image including an edge.

FIG. 10A is a diagram illustrating an exemplary image 200 including edges, and a black pixel region 201, a white pixel region 202, and a region 204 are the same as those of FIG. 2A.

Figure 10B:
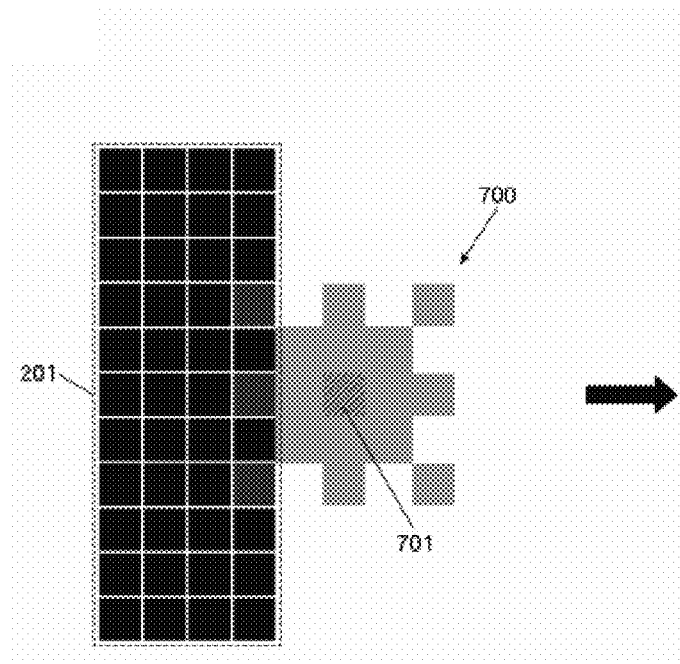
FIG. 10B is an example of a schematic diagram illustrating guided filter processing according to the present embodiment.

FIG. 10B is an enlarged view of a surrounding of the edges. FIG. 10B schematically illustrates a state in which the guided filter processing is performed in the present embodiment. In FIG. 10B, a region indicated by reference numeral 700 is an extension of local regions j corresponding to a target pixel 701. As illustrated in FIG. 10B, since the local regions j5 to j7 are located across edges, a variance $\sigma^2$ becomes larger as compared with the local regions j0 to j4 that are not located across edges. In the present embodiment, in filter processing unit 450, coefficients $a_j0 \sim a_j7$ and $b_j0 \sim b_j7$ are weighted-averaged according to variance $\sigma^2$ in each of the local regions j0 to j7. That is, coefficients $a_j0 \sim a_j4$ and $b_j0 \sim b_j4$ derived from local regions j0 to j4 are heavily weighted, and coefficient $a_j5 \sim a_j7$ and $b_j5 \sim b_j7$ derived from local regions j5 to j7 are lightly weighted. Therefore, coefficients $\bar{a}_j$ and $\bar{b}_j$ are derived so as to lower the dependence of an original image p, i.e., so as to increase the degree of smoothing. As a result, as illustrated in FIG. 10A, it is possible to suppress the occurrence of a region 203 (FIG. 2A) where noises remain in the image q.

As described above, the image processing apparatus 300 of the present embodiment has an effect of reducing noise around edges and outputting a high-quality image.

In the image processing apparatus 300 of the present embodiment, since the local region setting unit 430 sets a plurality of regions extending radially from a pixel of interest as a plurality of local regions j, the coefficient deriving unit 440 can appropriately derive a plurality of coefficients $a_j$ and $b_j$ for linearly transforming the image p.

In this case, for example, by setting a plurality of regions extending at equal intervals in four directions of upper right, lower right, lower left, and upper left from the pixel of interest as a plurality of local regions j, it is possible to derive coefficients $a_j$ and $b_j$ for linear transformation of the image p with high accuracy.

In this case, for example, by setting a plurality of regions extending at equal intervals in eight directions of upper, upper right, right, lower right, lower, lower left, left, and upper left from a pixel of interest as a plurality of local regions j, it is possible to derive a plurality of coefficients $a_j$ and $b_j$ for linearly transforming the image p with a higher degree of accuracy as compared with the case where a plurality of regions extending at equal intervals in four directions of upper right, lower right, lower left, and upper left from a pixel of interest are set as a plurality of local regions j.

Further, in the present embodiment, not only variance but also statistics such as standard deviation can be used as statistics indicating the variation of the pixel values in each of the plurality of local regions j, so that the degree of freedom of design can be enhanced.

In the image processing apparatus 300 of the present embodiment, since the filter processing unit 450 adaptively selects coefficients $a_j$ and $b_j$ derived from local regions j in which the variance of the pixel values satisfies the condition from the plurality of coefficients $a_j$ and the image p can be appropriately linearly transformed.

In this case, by including the condition in which the variances of the pixel values are ascending to a predetermined order, it is possible to appropriately select coefficients $a_j$ and $b_j$ from the plurality of coefficients $a_j$ and $b_j$ corresponding to each of the plurality of local regions j.

Further, when the above condition includes a condition that the variance of the pixel value is equal to or less than the threshold, coefficients $a_j$ and $b_j$ can be appropriately selected from the plurality of coefficients $a_j$ and $b_j$ corresponding to each of the plurality of local regions j.

Further, in the image processing apparatus 300 of the present embodiment, since the filter processing unit 450 performs the linear transformation based on the weighted average of the plurality of coefficients $a_j$ and $b_j$ according to the variances of the pixel values in the plurality of local regions j and the weighted averaged coefficients $\bar{a}_j$ and $\bar{b}_j$, it is possible to improve the accuracy of the linear transformation of the image p.

In addition, in the image processing apparatus 300 of the present embodiment, the reduced image generating unit 410 reduces the input image p, and the filter processing unit 450 upsamples and performs linear transformation on coefficients adaptively selected from the plurality of coefficients $a_j$ and $b_j$ derived by the coefficient deriving unit 440, whereby the reduced image generating unit 410 associates the coefficients $a_j$ and $b_j$ derived by the coefficient deriving unit 440 with the reduced unit (pixel unit of the reduced image) and then performs linear transformation on the image p appropriately.

(Specific Example)

Hereinafter, a difference between an output example of the guided filter processing in the prior art and an output example of the guided filter processing in the present embodiment will be described with reference to a specific example. In the following description, for simplification of description, it is assumed that an image p (guide image I) is a 3-bit gray scale image, a pixel value of a black pixel is 0, and a pixel value of a white pixel is 7. Further, it is assumed that the pixel value of the pixel of interest 701 should be "7", and that the pixel value is "4" due to the occurrence of noise. These are common to FIGS. 11A and 11B.

First, a use case of the prior art illustrated in FIG. 2B will be discussed.

Figure 11A:
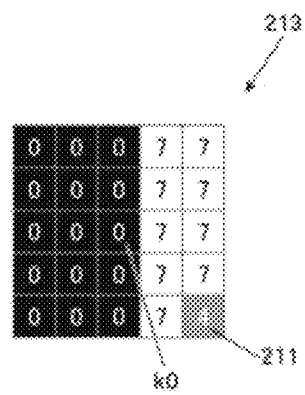
FIG. 11A illustrates an example of a local region according to the prior art.

FIG. 11A illustrates, as a comparative example, a local region 213 of the prior art, which is similar to the local region 213 in FIG. 2B.

In FIG. 2B, local regions exist for each of target pixels k0, k1, . . . , k24, but only the local region 213 corresponding to the target pixel k0 is illustrated for simplification of explanation.

Variances $\sigma^2$, averages $\mu$, coefficients a and b corresponding to each of target pixels k0, k1, . . . , k24 are as illustrated in FIG. 15. These values are calculated with a regularization parameter $\varepsilon=10$.

In a case where coefficients $a_k0 \sim a_k24$ and $b_k0 \sim b_k24$ corresponding to each of target pixels k0, k1, . . . , k24 are simply averaged, 0.32 as coefficient $\overline{a_k}$ and 3.88 as coefficient $\overline{b_k}$ are derived. When these coefficients $\overline{a_k}$ and $\overline{b_k}$ are applied to Expression 10, since the pixel value of the pixel of interest is "4", 5.16 is obtained as the output pixel value.

Next, a use case of the present embodiment illustrated in FIG. 10B will be discussed.

Figure 11B:
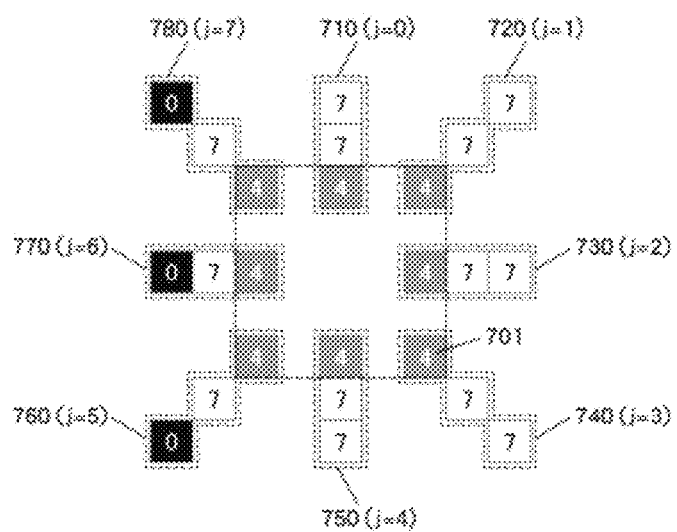
FIG. 11B illustrates an example of a local region according to the present embodiment.

FIG. 11B illustrates an example of local regions 710 to 780, i.e., local regions j0 to j7, of the present embodiment. Variance $\sigma^2$, average $\mu$, coefficients a and b corresponding to each of local regions j0 to j7 are illustrated in FIG. 16. These values are calculated with a regularization parameter $\varepsilon=10$.

In a case where the coefficients $a_j0 \sim a_j7$, $b_j0 \sim b_j7$ and the weights $w_j0 \sim w_j7$ corresponding to the local regions j0, j1 . . . , j7 are weighted and averaged using Expressions 21 to 23, 0.25 and 4.42 are obtained as coefficients $\overline{a_j}$ and $\overline{b_j}$ respectively. Then these coefficients $\overline{a_j}$ and $\overline{b_j}$ are applied to Expression 10, since the pixel value of the pixel of interest is "4", 5.43 is obtained as the output pixel value.

As described above, an output pixel value of guided filter processing in the present embodiment is a value closer to the original pixel value "7". This means that the noise reduction degree is larger than that in a case where guided filter processing in the prior art is performed.

Varied Embodiment 1

In the above-described embodiment, a technique of performing weighted averaging by weighting coefficients $a_j$, $b_j$ derived from local regions across edges with small weights has been described. In order to increase a degree of smoothing around an edge, Non-Patent Literature 2: "Cross-Based Local Multipoint Filtering", by Jiangbo Lu, Keyang Shi, Dongbo Min, Liang Lin, and Minh N. Do, in CVPR2012 proposes a technique of adaptively varying a local region so as not to straddle an edge.

Figure 12A:
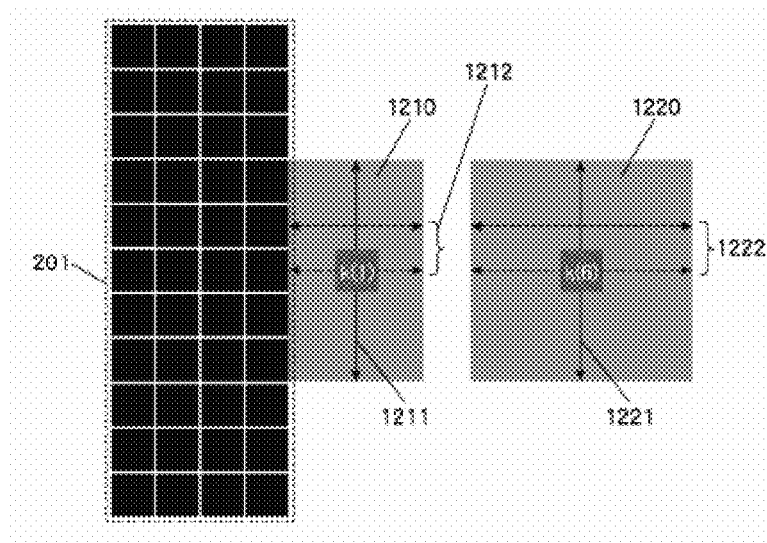
FIGS. 12A and 12B are schematic diagrams of the prior art described in Non-Patent Literature 2.
Figure 12B:
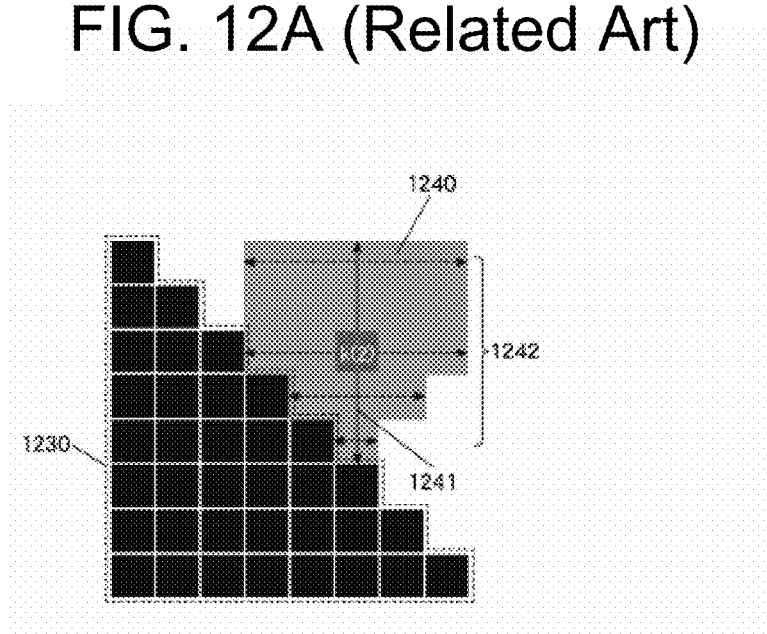

FIGS. 12A and 12B are schematic diagrams illustrating the prior art described in Non-Patent Document 2. In FIG. 12A, a local region 1210 corresponding to a target pixel k(1) and a local region 1220 corresponding to a target pixel k(7) are illustrated. The black pixel region 201 is the same as the black pixel region 201 in FIG. 2B.

In this prior art example, the local region is set based on an arm extending in the vertical direction with respect to the raster scan direction from the target pixel, and a plurality of arms extending in the horizontal direction with respect to the arm in the vertical direction. The length of the arm in the vertical direction is a predetermined fixed value. The length of each of the plurality of horizontal arms is searched from the vertical arm, and is determined to be twice the minimum value of the distance from the vertical arm to the edge. However, the upper limit of the length of the arm in the vertical direction is the fixed value.

For example, the local region 1210 is set based on a vertical arm 1211 having a fixed value of 5 pixels and a plurality of horizontal arms 1212 from the target pixel k(1). Since the arm length of each of the plurality of arms 1212 in the horizontal direction is three pixels, the local region 1210 is set to a size of 5×3 pixels.

Similarly, the local region 1220 is set based on a vertical arm 1221 having a fixed value of 5 pixels and a plurality of horizontal arms 1222 from the target pixel k(7). Since the arm length of each of the plurality of arms 1222 in the horizontal direction is 5 pixels, the local region 1220 is set to a size of 5×5 pixels. The numbers in parentheses indicate the number of pixels from the target pixel to the edge.

FIG. 12B is a schematic diagram illustrating the surrounding of an edge extending diagonally, and a black pixel region 1230 has an edge extending in a lower right direction with respect to the raster scan direction. Also in the prior art example of FIG. 12B, a local region 1240 is set based on a vertical arm 1241 having the fixed value of 5 pixels and a plurality of horizontal arms 1242 from the target pixel k(3). The length of each of the plurality of horizontal arms varies depending on the distance to the edge. Therefore, the local region 1240 is set to a shape as illustrated in FIG. 12B.

According to the prior art, the local region can be set so as not to straddle the edge, but in a case where the distance from the arm in the vertical direction to the edge is short, the local region becomes small. In general, if the local region becomes too small, a sufficient noise removing effect cannot be obtained. Further, in a case where the lengths of the plurality of arms in the horizontal direction are respectively changed, the calculation cost required for setting the local region increases. As a result, fasts in calculation, which is advantage of the guided filter processing is lost.

Figure 13:
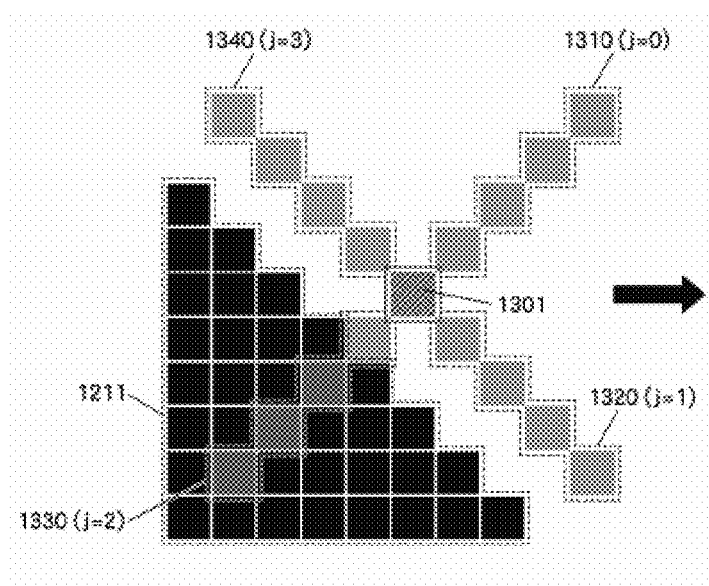
FIG. 13 is an example of a schematic diagram illustrating guided filter processing according to the varied embodiment.

FIG. 13 is an enlarged view of the surrounding of the edge in this varied embodiment. FIG. 13 schematically illustrates a state in which the guided filter processing in this varied embodiment is performed. Local regions 1310 to 1340 are a plurality of regions extending from a pixel of interest 1301 in four directions of upper right, lower right, lower left, and upper left at equal intervals when the raster scan direction is set to the right. Although FIG. 13 illustrates an example in which one local region is composed of five pixels, the number of pixels is not limited.

Also in this varied embodiment, since the coefficient ($a_j0$, $b_j0$), ($a_j1$, $b_j1$), ($a_j3$, $b_j3$) derived from the local regions j0, j1, and j3 that do not straddle the edge is adaptively selected, the coefficients $\overline{a_j}$ and $\overline{b_j}$ are derived so that the degree of smoothness around the edge becomes high. As a result, also in the image processing apparatus 300 of this varied embodiment, the noise around the edge can be reduced and a high-quality image can be output.

Varied Embodiment 2

In the above-described embodiment, the process of selecting the pixel of interest by performing raster scanning from the pixel that was the object of the previous process and setting the local region for the selected pixel of interest is repeated. In this case, the mode of the local region may be changed based on the establishment of the specific condition.

Since a variance $\sigma^2$ becomes large in a region including an edge, a weight $w_j$ of the weighted average calculated in Expression 23 becomes small, and conversely, since a variance $\sigma^2$ becomes small in the region not including an edge, a weight $w_j$ of the weighted average calculated in Expression 23 becomes large. Therefore, in a case where the weight $w_j$ calculated for each of the plurality of local regions j set for one pixel of interest includes a weight $w_j$ whose value is obviously larger than the value of the other local regions, it is considered that there is a high possibility that edges exist around the pixel of interest.

Therefore, for example, it is determined that "a weight $w_j$ having a relatively large value compared to the other local regions j is included in the weight $w_j$ calculated for each of the plurality of local regions j" as a specified condition. In a case where a pixel of interest is selected by performing raster scanning, it is determined whether or not the specific condition is satisfied every time a new pixel of interest is selected. Then, when the specific condition is satisfied, the region constituted by the eight arms extending radially for the next selected pixel of interest may be set as the local region j, and when the specific condition is not satisfied, the region constituted by the four arms extending radially for the next selected pixel of interest may be set as the local region j so that the local region in which the number of arms differs according to the success or failure of the specific condition may be set.

In addition, for example, when the specific condition is satisfied, a region constituted by an 8-direction (or 4-direction) arm including 5 pixels extending radially for the next selected pixel of interest may be set as the local region j, and when the specific condition is not satisfied, a region constituted by an 8-direction (or 4-direction) arm including 3 pixels extending radially for the next selected pixel of interest may be set as the local region j, so that a local region having a different number of pixels included in the arm may be set in accordance with the success or failure of the specific condition.

Similarly, for example, the interval at which the pixels included in the arm are intermittently may be changed or the width of the arm may be changed in accordance with the success or failure of the specific condition.

In addition, for example, the same process as described above may be performed by setting "the number of local regions in which the variance $\sigma^2$ exceeds (or is equal to or greater than) the threshold value among the plurality of local regions j has reached a predetermined number" as the above-described specified condition.

Other Embodiment

The respective functional units constituting the image processing apparatus 300 are realized by, for example, a CPU 301 reading and executing a guided filter processing program 3031 stored in a ROM303 or the auxiliary storage device 305 or a program designed to realize the image processing methods described in the above embodiments. That is, the computer can be made to function as each unit constituting the image processing apparatus 300 by the guided filter processing program 3031 or a program designed to realize the image processing method described in the above embodiment.

The program and data for realizing the image processing method described in the above embodiment can be provided in a state of being stored (recorded) in a computer-readable storage medium (recording medium). These media include memory cards, compact flash cards, hard disk drives, hybrid hard drives, optical disks, optical disks, magnetic disks, recordable disks, and flash memory.

Figure 14:
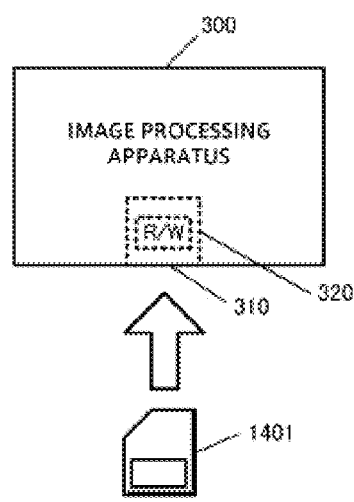
FIG. 14 illustrates an example of a computer-readable medium.

Specifically, for example, as illustrated in FIG. 14, the image processing apparatus 300 is provided with a card slot 310 for inserting a memory card 1401, and a card reader/writer (R/W) 320 for reading information stored in the memory card 1401 inserted in the card slot 310 or writing information to the memory card 1401 is provided. The card reader/writer 320 writes programs and data stored in the memory of the image processing apparatus 300 to the memory card 1401 under the control of the CPU301. The program and data recorded in the memory card 1401 are read by an external apparatus different from the image processing apparatus 300, so that the image processing in the above embodiment can be realized by the external apparatus.

What is claimed is:

1. An image processing apparatus for obtaining an output image by performing a filter processing of an input image, the image processing apparatus comprising:
   a non-transitory storage medium; and
   a hardware processor coupled to the non-transitory storage medium and configured at least to:
   set a plurality of local regions in the input image;
   derive a plurality of coefficients corresponding to each of the plurality of local regions based on statistics indicating variations in pixel values in the plurality of local regions; and
   obtain an output pixel value by performing a linear transformation of the input image based on a coefficient adaptively selected from the plurality of the coefficients,
   wherein the plurality of local regions includes a region that is partitioned diagonally to a raster scan direction.

2. The image processing apparatus according to claim 1, wherein the plurality of local regions includes a plurality of regions that extend radially from a pixel of interest.

3. The image processing apparatus according to claim 1, wherein the plurality of local regions includes a plurality of regions that extend at equal intervals in four directions of upper right, lower right, lower left, and upper left from a pixel of interest.

4. The image processing apparatus according to claim 1, wherein the plurality of local regions includes a plurality of regions that extend at equal intervals in eight directions of upper, upper right, right, lower right, lower, lower left, left, and upper left from a pixel of interest.

5. The image processing apparatus according to claim 1, wherein the statistics indicating variations includes variances or standard deviations of pixel values in the plurality of local regions.

6. The image processing apparatus according to claim 1, wherein the hardware processor configured to adaptively select coefficients derived from local regions in which the statistics satisfy a predetermined condition from the plurality of coefficients.

7. The image processing apparatus according to claim 6, wherein the predetermined condition includes a condition in which the statistics are up to a predetermined rank in ascending order.

8. The image processing apparatus according to claim 6, wherein the predetermined condition includes a condition that the statistics are less than or equal to a threshold.

9. The image processing apparatus according to claim 6, wherein the hardware processor is further configured to calculate a weighted average of the plurality of coefficients according to the statistics in the plurality of local regions, and perform the linear transform based on the weighted average coefficient.

10. The image processing apparatus according to claim 1, wherein the hardware processor is further configured to
reduce the input image,
wherein the hardware processor is configured to perform the linear transformation by up-sampling the coefficient adaptively selected from the plurality of coefficients.

11. The image processing apparatus according to claim 1, wherein the hardware processor is further configured to
generate integral images from the input image,
wherein the hardware processor is configured to set the plurality of local regions based on the integral images.

12. An image processing method used by an image processing apparatus comprising a hardware processor and a non-transitory storage medium for obtaining an output image by performing a filter processing of an input image, the image processing method executed by the hardware processor comprising:
setting a plurality of local regions in the input image;
deriving a plurality of coefficients corresponding to each of the plurality of local regions based on statistics indicating variations in pixel values in the plurality of local regions; and
obtaining an output pixel value by performing a linear transformation of the input image based on a coefficient adaptively selected from the plurality of the coefficients,
wherein the plurality of local regions includes a region that is partitioned diagonally to a raster scan direction.

13. A non-transitory recording medium recording an image processing program to be loaded into a hardware processor of a computer to obtain an output image by performing a filter processing of an input image, wherein the image processing program causing the hardware processor at least to:
set a plurality of local regions in the input image;
derive a plurality of coefficients corresponding to each of the plurality of local regions based on statistics indicating variations in pixel values in the plurality of local regions; and
to obtain an output pixel value by performing a linear transformation of the input image based on a coefficient adaptive selected from the plurality of the coefficients,
wherein the plurality of local regions includes a region that is partitioned diagonally to a raster scan direction.

* * * * *